United States Patent Office 3,705,063
Patented Dec. 5, 1972

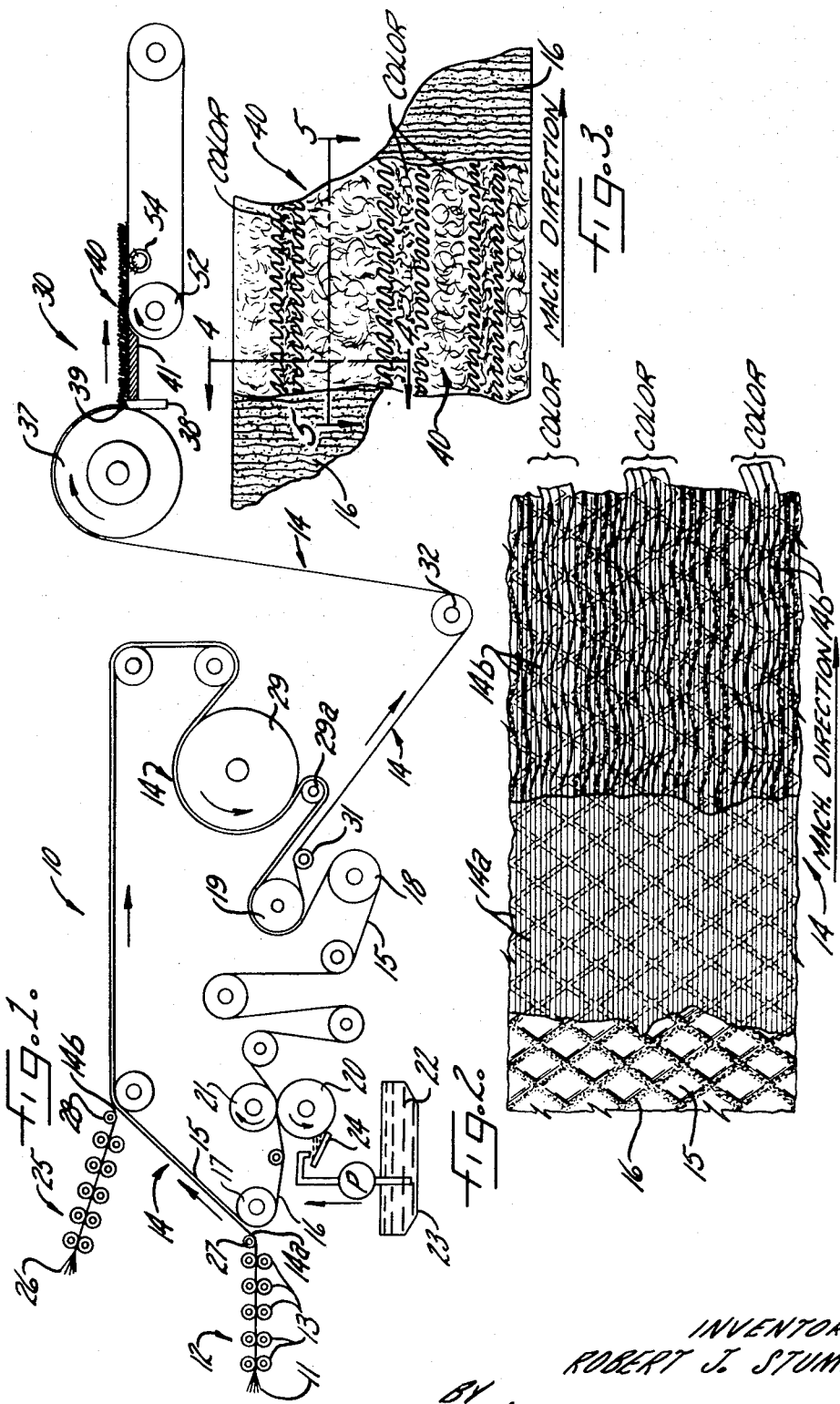

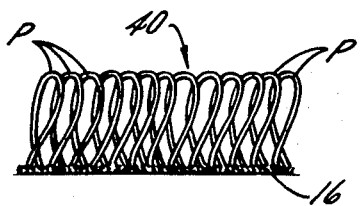
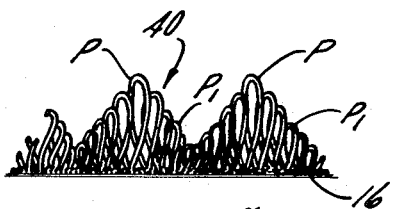
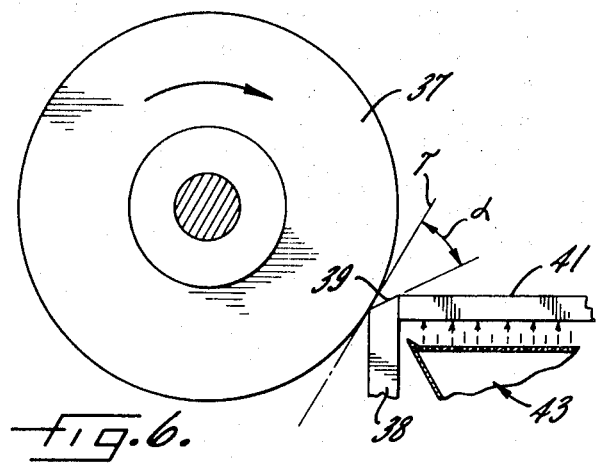
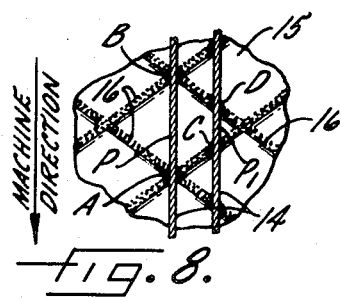
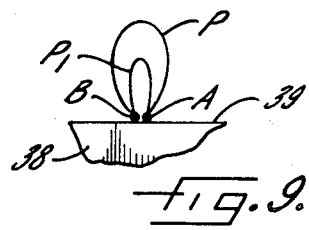
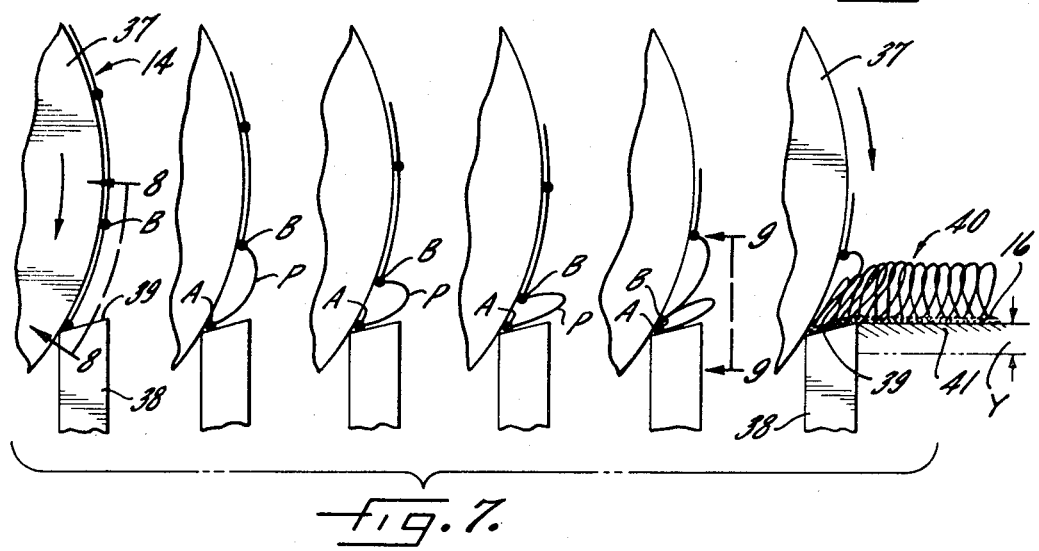

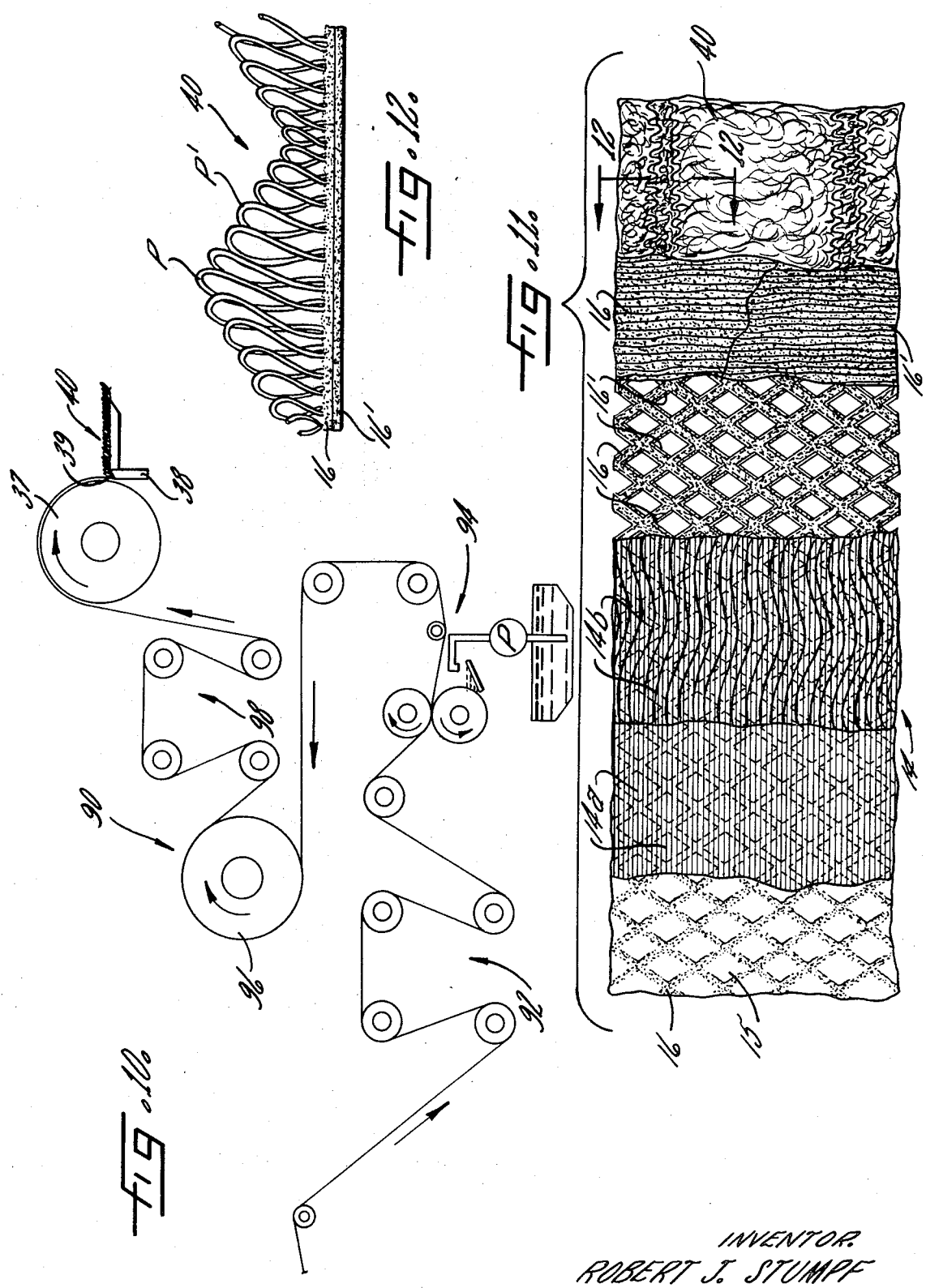

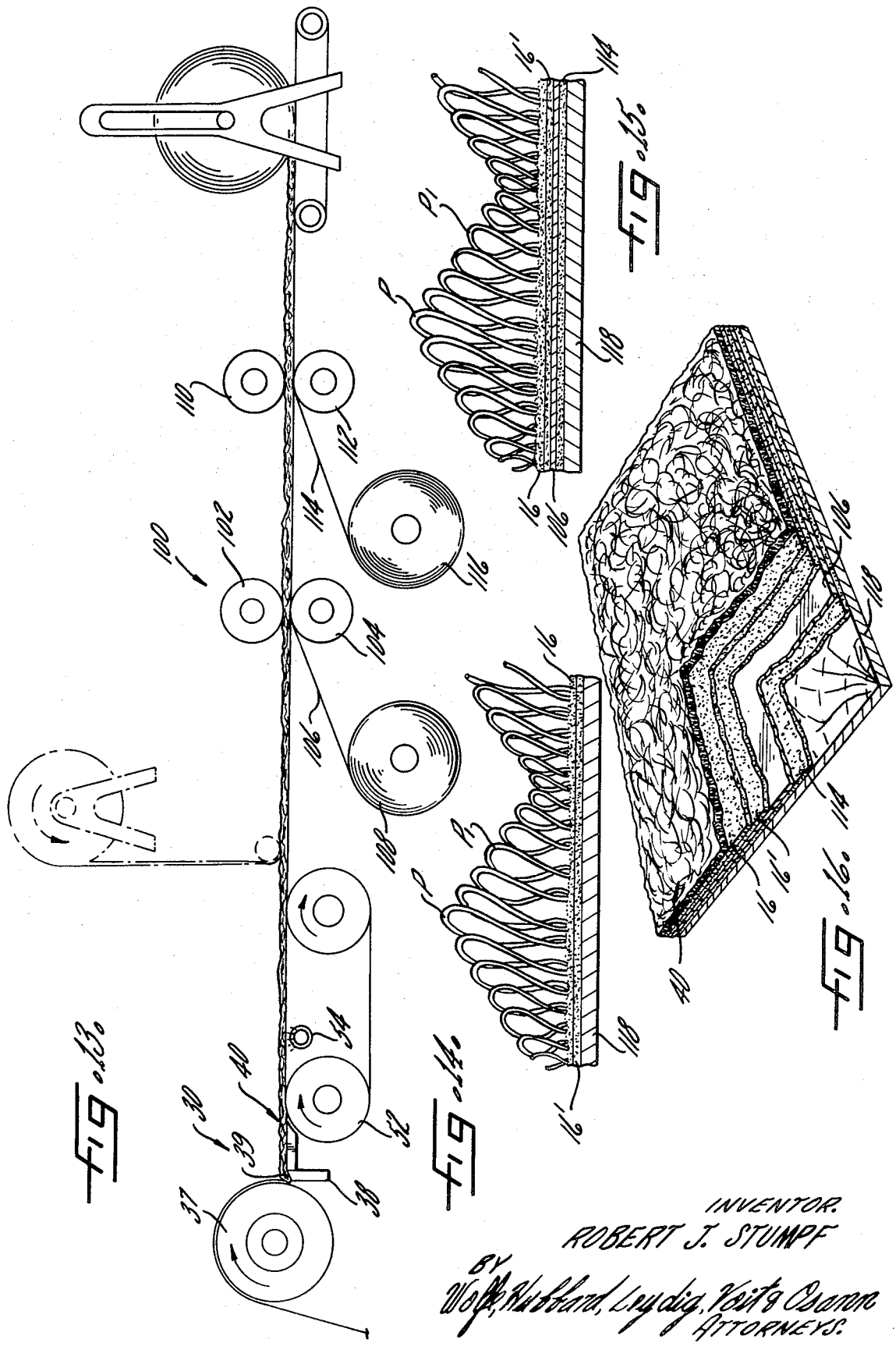

3,705,063
METHOD OF PRODUCING HIGH-LOFT, NONWOVEN PANELING MATERIAL AND COVERING
Robert J. Stumpf, Appleton, Wis., assignor to Kimberly-Clark Corporation, Neenah, Wis.
Filed Oct. 5, 1970, Ser. No. 78,004
Int. Cl. D04h *11/00*
U.S. Cl. 156—72    14 Claims

ABSTRACT OF THE DISCLOSURE

A paneling material comprising a laminated construction having a layer of adhesive and a multiplicity of elements looped outwardly from the layer and a layer of nonflexible material, such as plywood, plastic, or the like, laminated to the adhesive layer; and a method of making the paneling material by first embedding a web of elements in an open pattern of adhesive, bonding the elements in the adhesive, consolidating the adhesive into a continuous backing layer while looping the elements outwardly from the adhesive backing, and laminating the nonflexible material to the adhesive backing. In certain instances, a second pattern of adhesive may be applied to the first pattern of adhesive prior to the consolidation step. Also a barrier layer may be interposed between the nonflexible material and the adhesive backing. Also, the invention includes a new use for a high-loft nonwoven material, namely: as a wall covering material.

RELATED APPLICATIONS

George H. Saunders, Robert C. Sokolowski and Robert J. Stumpf, Ser. No. 498,929, filed Oct. 20, 1965, now abandoned and replaced by Ser. No. 79,287 filed Oct. 8, 1970.

Ronald H. Wideman, Ser. No. 551,605, filed May 20, 1966, now Pat. No. 3,553,064.

Robert J. Stumpf and William L. Mowers, Ser. No. 553,483, filed May 27, 1966, now Pat. No. 3,553,065.

Robert J. Stumpf, Ser. No. 769,959, filed Oct. 23, 1968, now abandoned, and replaced by Robert J. Stumpf, Ser. No. 31,225, filed Apr. 23, 1970.

Robert J. Stumpf, Ser. No. 820,224, filed Apr. 29, 1969.

Robert J. Stumpf, Ser. No. 856,793, filed Sept. 10, 1969.

Herman G. Minshell, Robert J. Stumpf and William J. Mattes, Ser. No. 77,840, filed Oct. 5, 1970.

DESCRIPTION OF THE INVENTION

The present invention relates in general to nonwoven fabrics and, more particularly, to nonwoven wall covering fabrics and wall paneling and to methods for making high-loft, nonwoven wall paneling.

In recent years, many different types of nonwoven materials have been produced, both to replace conventional woven fabrics and, also to create new markets in which woven fabrics have not yet become established. This is particularly true in the case of materials for single-use and disposable products, such as: sanitary supplies, hospital garments, disposable sheets, and the like. For these applications the nonwoven fabric is generally made in continuous sheet form with one or more layers of staple length fibers and/or a reinforcing scrim structure adhesively bonded together or laminated between plies of other materials such as cellulosic wadding and plastic sheeting. The fibers may be natural, synthetic or various blends and, of course, the particular composition of the nonwoven fabric is greatly influenced by its intended use.

Exemplary of such nonwoven fabrics are those disclosed in U.S. Pat. Nos. 2,902,395, 3,047,444, 3,072,511, 3,327,708 and 3,484,330, and the aforesaid copending U.S. patent applications, Ser. Nos. 498,929, 551,605 (now Pat. No. 3,553,064) and 553,483 (now Pat. No. 3,553,-065), all of which are assigned to the same assignee as the present application. While the products disclosed in the foregoing issued patents and copending applications have many different attributes and characteristics, they all have one thing in common—viz, the principal fibers are nearly all disposed substantially parallel to the surfaces of the nonwoven material. As a result, the material is either relatively thin and flat or, such substantial thickness and surface texture as are imparted to the fabric are provided by creping or embossing various layers of the material or, in some instances, the final nonwoven fabric.

It is also well known that natural fibers, particularly cotton and wool, have an inherent kink or crimp resulting from the way in which these fibers grow. This natural crimp is, of course, highly beneficial and contributes largely to the strength of thread made of a multiplicity of staple length fibers. In addition, it is the natural crimp of these fibers that imparts certain characteristics of texture and body to materials woven therefrom.

In contrast, synthetic fibers, as initially formed, do not have any appreciable kink or crimp since they are generally formed in continuous monofilaments. However, it is also well known that most synthetic fibers can be crimped and heat-set by passing the fibers through a heated stuffing box.

Wall covering materials have been produced for years that have a bulky, thick napped, construction and appearance. In some instances, types of carpeting have been used to cover walls of offices and homes, for example. Such heavy, substantial appearing wall covering materials may be quite expensive due to the fact that in many instances they must be woven in the same manner as conventional carpeting, even though such wall coverings are not required to withstand the abuse and traffic that floor carpeting is subjected to. Therefore, the heavier designer wall coverings are often significantly more expensive than the relatively thin wallpaper or the like.

Similarly, wall paneling materials comprised of many different kinds and shades of woods are available to purchasers in many price ranges. Relatively thick solid wood paneling is generally more expensive as compared to paneling that has a wood veneer associated with a layer of plywood or pressed wood. The advantages of wall paneling include the fact that in some applications, it may be applied directly to wall studs, therefore eliminating the need for plastering or the presence of plasterboard between the studs and the paneling material.

Accordingly, it is a primary object of the present invention to provide a method of making nonwoven wall covering materials which are characterized by the simultaneous looping of a large number of fibers, threads or the like and the incorporation of the thus looped fibers into a nonwoven fabric with the loops extending outwardly from the backing layer, to thereby produce a novel high-loft wall covering material with a pleasing surface texture and appearance that may be applied directly to a surface such as a wall, or the like.

Another object of the present invention is to provide a wall paneling characterized by a first layer comprising a high-loft, nonwoven fabric having a continuous backing of flexible adhesive and a multiplicity of fibers individually looped outwardly from the backing and a second layer of nonflexible material, such as plywood or the like, secured to the adhesive backing.

Yet another object of the present invention is to provide a method of making a wall paneling whereby a relatively thin barrier layer is interposed and secured to the backing of the high-loft, nonwoven fabric and the nonflexible material to permit the use of any of a wide variety of adhesives or adhesive means for securing the high-loft, nonwoven fabric to the layer of nonflexible material.

A further object of the present invention is to provide a method of making a high-loft, nonwoven wall covering material that is economical as compared to woven wall covering materials, but which may have the appearance of such woven materials.

Other objects and advantages of the present invention will become more readily apparent upon reading the following detailed description and upon reference to the attached drawings, in which:

FIG. 1 is a schematic view, in side elevation, of one form of apparatus which may be employed to produce a high-loft, nonwoven fabric;

FIG. 2 is a fragmentary plan view of an illustrative web of base material while still supported on a conveyor belt, somewhat simplified and exaggerated for the sake of clarity of illustration, with portions broken away to expose the various layers;

FIG. 3 is a fragmentary plan view of one embodiment of the product made by the apparatus of FIG. 1;

Figure 17:
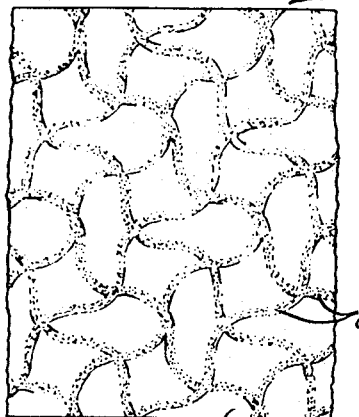

FIGS. 4 and 5, respectively, are greatly enlarged, simplified, and somewhat exaggerated sectional views taken substantially along the lines 4—4 and 5—5 in FIG. 3;

FIG. 6 is an enlarged schematic detail view, in side elevation, of the forming drum and gathering blade of the apparatus shown in FIG. 1;

FIG. 7 is an enlarged schematic side elevational view illustrating, in somewhat idealized fashion, successive stages in the sequence of gathering and looping of individual fibers;

FIG. 8 is an enlarged schematic fragmentary view, taken substantially along the line 8—8 of FIG. 7, here showing a fragment of the fiber web and adhesive pattern with illustrative fibers attached to the adhesive;

FIG. 9 is a simplified schematic view, taken substantially along the line 9—9 of FIG. 7, here showing the fragment of the fiber web and adhesive pattern depicted in FIG. 8 at a later stage in the loop forming sequence;

FIG. 10 is a schematic view, in side elevation, of one form of apparatus that may supplement the apparatus shown in FIG. 1, and is adapted to apply a second pattern of second adhesive upon the first pattern of adhesive;

FIG. 11 is a fragmentary plan view of an illustrative web of base material having two applications of adhesive, the view being somewhat simplified and exaggerated for the sake of clarity of illustration, with portions broken away to expose the various layers;

FIG. 12 is a greatly enlarged, simplified and somewhat exaggerated sectional view taken substantially along the line 12—12 of FIG. 11;

FIG .13 is a schematic view, in side elevation, of exemplary apparatus which may be employed to apply a means for securing the high-loft fabric to the nonflexible material;

FIG. 14 is a fragmentary view of the wall paneling material, greatly enlarged and in cross section, illustrating the various layers of the paneling material;

FIG. 15 is a fragmentary view of the wall paneling material, greatly enlarged and in cross section, illustrating the wall paneling material having a barrier sheet as well as a securing means attached thereto;

FIG. 16 is a perspective view illustrating the wall paneling material having been cut in predetermined size and shape for subsequent application to a surface; and, FIGS. 17 through 20 illustrate, in plan view, exemplary alternative adhesive patterns that may be used for the base web.

While the invention is susceptible of various modifications and alternative forms, specific embodiments thereof have been shown by way of example in the drawings and will herein be described in detail. It should be understood however, that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

To produce of high-loft, nonwoven fabric, a base web of fibers is first prepared and an open adhesive pattern is applied to one side of the web. Different procedures have been used in preparing the base web. For example, textile length fibers may be processed through conventional cotton card machinery to produce a carded web for the base web. In such a carded web 50% to 70% of the fibers may be oriented substantially parallel with the machine direction. It has been found, however, that the most uniform product has been obtained with the method of the present invention by using base webs having a higher percentage of the fibers alined with the machine direction such, merely by way of example, as a highly drafted web in which, as a result of the drafting process, 80% to 95% of the fibers may be alined with the machine direction. Such webs of bonded, highly drafted fibers, of course, have substantial utility in themselves and are the subject, for example, of the aforesaid copending applications, Ser. Nos. 498,929 and 553,483 (now Patent No. 3,553,065).

One aspect of the present invention, however, goes far beyond the preparation of an adhesively bonded carded web or the products and methods disclosed in those two applications, and results in the formation of a wall paneling material having a high-loft nonwoven surface which is significantly different from the nonwoven web utilized as the base material. Another aspect of the present invention involves a new use for a high-loft nonwoven fabric, the new use being as a wall covering material.

Broadly stated, the method of the present invention regarding the wall paneling material involves taking the base material and performing the subsequent steps of: (1) reactivating the open pattern of adhesive in which the fibers are embedded; and, (2) consolidating the adhesive into a backing layer, while (3) simultaneously looping the portions of the fibers across the open spaces of the adhesive outwardly from the backing layer formed by the consolidated adhesive, and (4) securing the thus produced high-loft nonwoven fabric to a nonflexible material, such as plywood or the like. Further methods and steps may include applying a second pattern of adhesive upon the first pattern prior to the reactivation and consolidation steps, and the step of securing a barrier layer to the consolidated adhesive backing as well as a means for securing the barrier layer to the layer of nonflexible material.

The resulting product has a surface that is characterized by the high loft or deep pile of the loops of fibers which extend outwardly from the adhesive backing. The particular depth of pile or degree of loft of the loops, of course, depends upon a combination of control parameters, including, for example: the type of and denier of the base fibers; and the amount of and spacing within the original adhesive pattern; the angle of the gathering blade; and the relative speeds of fabric delivery to and fabric discharge from the gathering blade; as will be discussed hereinafter.

By way of background, the basic method for producing a high-loft nonwoven fabric will now be described in detail. Turning now to the drawings, FIG. 1 schematically illustrates an exemplary apparatus for producing a high-loft nonwoven fabric. This apparatus includes a web forming section 10 and an adhesive compacting and fiber looping section 30. The web forming section 10 is generally similar to the apparatus disclosed in the aforesaid copending application, Ser. No. 498,929, with certain modifications as disclosed in the aforesaid copending application, Ser. No. 553,483 (now Pat. No. 3,553,065), but it is here shown in more complete and visible form than shown in either of those disclosures. It will be appreciated as the ensuing description proceeds, that fiber webs made in accordance with the method disclosed in the aforesaid copending application, Ser. No. 498,929, are also usable with the subsequent method steps for producing the hereinafter described fabric, as are carded webs and webs prepared by other processes.

As shown in FIG. 1, multiple slivers 11 of textile fibers are drawn from their respective supply cans (not shown) into a draw frame 12 which comprises a series of pairs of groved rolls 13; the rolls of each pair being driven by appropriate gearing (not shown, but well known in the art) at a peripheral rate of speed somewhat faster than the rate of operation of the preceding pair. Merely by way of example, the pairs of rolls 13 may be adjusted to provide an over-all increase in speed and, therefore, an extent of fiber draw on the order of 15:1 through the draw frame 12. As the juxtaposed slivers pass through draw frame 12, the individual fibers are drafted and spread out to form a flat, striated web of substantially alined fibers as shown at 14. Web 14 is maintained adjacent a supporting conveyor sheet 15 on the surface of which adhesive has been previously applied in a preselected pattern.

In this embodiment, the conveyor sheet 15 comprises an endless conveyor belt treated on at least its upper surface with a release agent. One example of such a belt comprises woven glass fiber with a surface coating of tetrafluoroethylene resin. Other examples of release coatings are well known, and comprise such materials as silicones, fatty acid metal complexes, certain acrylic polymers, and the like. Heat resistant films or thin metal sheets treated with release agents may also be used as the carrier sheet.

Prior to the time the web 14 is picked up by the belt 15, the latter has imprinted on its release-treated surface a pattern of flexible, thermoplastic adhesive such as is shown at 16 in FIG. 2. It will be understood that, as shown in FIG. 1, the adhesive is actually on the underside of belt 15 which becomes the upper surface after passing around roll 17, at which time the adhesive pattern 16 directly contacts the fiber web 14. The pattern is shown as being visible in FIG. 2 only for illustrative purposes.

The belt 15 is fed around roll 17 at a speed slightly in excess of the delivery speed of the final pair of rolls 13 of draw frame 12 in order to maintain web 14 under slight tension, whereby the individual highly-drafted fibers are retained in their alined and tensioned condition. Drive rolls 18, 19 are rotated (by suitable drive means, not shown) to drive belt 15 at a speed sufficient to maintain the proper tension on the web 14.

In the method shown for applying adhesive, the belt 15 is fed through a nip formed between a printing roll 20 and a back-up roll 21 maintained in very light pressure engagement therewith. The surface of printing roll 20 is provided with an intaglio pattern to which adhesive may be supplied in various ways well known to those skilled in the art. For example, in the aforesaid parent application, Serial No. 769,959, a system is schematically disclosed wherein the lower portion of the printing roll 20 picks up adhesive directly from a dip pan, with excess adhesive being removed by a doctor blade, thus leaving only the intaglio patterned surface filled. However, it has been found that more satisfactory results are obtained by pumping or otherwise transferring adhesive 22 from a supply pan 23 to a reservoir located immediately above an inclined doctor blade 24—the reservoir being defined in part by the upper surface of the inclined doctor blade and the adjacent portion of the rotating peripheral surface of the printing roll 20. Thus, as the printing roll 20 rotates (in a counterclockwise direction as viewed in FIG. 1), the intaglio patterned surface thereof is filled with adhesive 22, excess adhesive is removed by the doctor blade 24, and a metered amount of adhesive is then transferred to the underside of release coated belt 15 in a preselected pattern. The pattern shown in FIG. 2 is in the form of an open diamond pattern of adhesive.

The particular dimensions of the intaglio pattern employed and, indeed, the actual pattern itself, are not critical to the practice of the invention in its broadest aspects. Thus, it has been found that patterns other than the illustrative diamond pattern hereinabove referred to can be utilized, and certain of such patterns will be subsequently described in connection with FIGS. 17–20. For illustrative purposes, however, it is noted that excellent results have been achieved where a diamond pattern was employed in which adjacent lines of adhesive were spaced apart in both directions by ¼", and wherein the intaglio printing roll 20 had adhesive cells or lines 0.007" deep and 0.025" wide. In certain instances, however, it has been found that the dimensions of the adhesive cells or lines, together with their spacing, are critical and must differ from the foregoing exemplary dimensions, and certain of such other arrangements are disclosed in the aforesaid copending applications, Ser. Nos. 856,793 and 77,840, both of which are assigned to the assignee of the present invention.

Since the surface of belt 15 is treated with a release coating, the adhesive remains substantially on the surface with no penetration therein and is preferably in a somewhat tacky condition. The printed belt is drawn from the printing nip around roll 17 positioned closely adjacent the output end of draw frame 12 and, as stated above, at a speed slightly in excess of the delivery speed of the last two rolls in the draw frame. The web 14 emerging from the draw frame 12 is deposited on the tacky adhesive 16 on belt 15 and held in tensioned engagement therewith by the adhesive and the above-mentioned speed differential. This continuous tension prevents the fibers in the web from losing their highly-drafted and alined condition.

In practicing the method additional alined and highly-drafted fibers may be added to the web 14 on the adhesively printed belt 15. For this purpose, a second draw frame 25 similar to the draw frame 12 is provided to draw additional slivers 26 of fibers from their supply cans (not shown) and, after drafting and alining them, to deposit the fibers on the moving web 14 carried by the belt 15. In such cases, the amount of adhesive printed on the belt 15 may be increased to insure that some of the adhesive in the adhesive pattern 16 penetrates the fibers of web 14 drawn from the draw frame 12 and reaches the fibers drawn from slivers 26 which pass through the second draw frame 25. The arrangement is such that the adhesive contact between the fibers drawn from slivers 26 and the pattern 16, together with the speed differential of the belt 15 relative to the last pair of rolls in the draw frame 25, maintains the fibers drawn from slivers 26 under slight tension, whereby they also maintain their highly-drafted and alined condition.

The fibers deposited on the web 14 from draw frames 12 and 25 need not be the same kind, size, color or quantity. Nor, for that matter, do the fibers of the slivers 11 and 26 need to be uniform in these respects as they are drawn into the draw frames 12 and 25. Thus, various blends of fiber sizes, kinds, colors and quantities can be deposited across the web 14 from each of the draw frames 12 and 25 and in various combinations of first and second layers of fibers. Additional draw frames can also be employed if desired.

The fibers from each of the draw frames 12 and 25 pass under respective bars 27 and 28 before being deposited on the belt 15. The bars 27, 28 may be oscillated in a direction generally transverse to the movement of the web 14 and, preferably, provision is also made for controlling the frequency and amplitude of the oscillation of one bar relative to the other. Thus, as each bar is oscillated, the fibers deposited from the respective draw frames 12 and 25 take on a generally sinusoidal or sawtooth wave pattern of controlled frequency and amplitude. A simple, but somewhat similar, oscillating bar arrangement is disclosed in the aforesaid copending application, Ser. No. 553,483. However, the single bar arrangement there disclosed did not afford, nor even contemplate, the significantly improved attributes made possible by this method.

An example of the web 14 formed on the illustrative apparatus 10 (FIG. 1) is shown in FIG. 2. As previously mentioned, a series of parallel and diagonally disposed lines of adhesive are printed in criss-cross fashion on the belt 15 to form a pattern 16 of adhesive having substantially open spaces in the configuration of diamonds. In depositing the fibers from the first draw frame 12, the bar 27 was not, in this instance, oscillated. Thus, the fibers making up the first component 14a of the web 14 are substantially all alined in the direction of web movement. The fibers making up the second component 14b of the web, however, will be seen to be deposited in a generally wavy or saw-tooth pattern as a result of oscillation of the bar 28 associated with the second draw frame 25, thus altering the appearance characteristics of the finished fabric. In addition, oscillation of the bars 27 and/or 28 serves to alter the structural and functional characteristics of the fabric in that a controllable percentage of the fibers may be deposited on the open adhesive pattern at an angle to the machine direction. It has been found that such fibers do not interfere to any significant extent with the subsequent fiber looping steps. Moreover, it is believed that the presence of such fibers extending at an angle to the machine direction serves to increase the cross-directional strength of the fabric being produced by actually increasing the number of oriented fibers which extend partially in the fabric cross-direction. Preferably, when both bars 27 and 28 are oscillated they are oscillated in out-of-phase relation to one another so as to cause fibers in one web component 14a to cross fibers in the other web component 14b at even greater angles while simultaneously maintaining the fibers in a highly oriented state. It will, of course, be understood that the phase and amplitude of the oscillated fiber pattern may be selectively adjusted and controlled to provide a controlled angular deposition of fibers on the open adhesive pattern 16, thus enabling control of the cross-directional strength characteristics of the fabric resulting from fiber oscillation. This will, of course, vary dependent upon various other parameters such, for example, as the type of fibers employed, the type of adhesive employed, fiber-adhesive ratios, gathering ratios, and indeed, the particular end use to which the fabric is to be put. Consequently, in many instances it may not be desirable to oscillate either bar 27 or 28. It should be appreciated, of course, that FIG. 2 is only intended to be illustrative and, while the lines representing the fibers for both components 14a and 14b are spaced apart for clarity, in practice the highly-drafted fibers of both components are very close to one another.

Also for illustrative purposes, it will be noted that web component 14b has three bands of fibers designated color. These bands of fibers may be the same or different colors; but, in any event, they differ from the color of the balance of the fibers of web component 14b. Further, as previously mentioned, the fibers of web component 14b may differ from those of component 14a in kind, size, color or quantity depending upon the desired color pattern and surface characteristics of the final product, as more specifically described below.

Following deposit of web components 14a and 14b on the adhesive printed belt 15, the belt is drawn around a heated curing drum 29 where fusing and curing of the adhesive is substantially completed while the web 14 is maintained in firm contact therewith to bond the individual fibers. To insure effective heating and fusing of the adhesive, it is desirable that travel of the combined belt and web be around a substantial portion of the drum 29. In the illustrated embodiment, a fly roll 29a is positioned to apply tension on the combined belt and web as they travel around the drum 29 to insure complete embodiment of the fibers in the adhesive. The fibers of the web 14 are thus bonded together while retaining their highly-drafted and substantially alined condition in the particular pattern in which they were deposited on the open pattern of adhesive 16 printed on the belt 15.

After leaving the fly roll 29a, the combined web 14 and belt 15 are preferably passed over the drive roll 19, which also serves as a cooling drum to set the adhesive. The bonded web 14 is stripped from the release-coated surface of the belt 15 by the guide roll 31 as the web leaves the cooling drum 19.

While various well-known adhesives may be employed in the foregoing process, advantages reside in the use of plastisols, which are colloidal dispersions of synthetic resins in a suitable organic ester plasticizer, and which, under the influence of heat, provide good binding power while remaining soft and flexible. While many adhesives of this type are known, those found particularly useful for incorporation in the product of this invention include vinyl chloride polymers, and copolymers of vinyl chloride with other vinyl resins, plasticized by orgaic phthalates, sebacates, or adipates. These provide a fast curing plastisol adhesive characterized by relatively low viscosity, low migration tendencies, and minimum volatility. Such adhesives remain soft and flexible after curing, and can be reactivated by subsequent heating.

It has been found that other adhesives may be employed in the process—for example, organisols utilizing resins such as the vinyl chloride polymers and copolymers. Furthermore, still other adhesives may be employed provided that they satisfy specified characteristics in the base web produced in the web forming section 10, and in the finished fabric produced in the adhesive compacting and fiber looping section 30 (FIG. 1). In general, such adhesives should be applied to the base web by procedures which will not disarrange the fibrous structure of the web; such adhesives should heat—set at temperatures below the degradation temperature of the fibers in the base web 14 to secure bonding of the fibers to the adhesive; such adhesives should be reactivatable in the subsequent adhesive gathering and consolidation stage of the process; and such adhesives should form a flexible backing layer for the finished fabric and should strongly bond the fiber loops in place. For example, emulsions of thermoplastic resins such as acrylics and rubber-like compounds, illustratively ABS, have the requisite properties to serve as the bonding adhesive for the web 14.

The base material, made as heretofore described and comprising a web 14 of highly-drafted fibers embedded in an open adhesive pattern, is fed into the adhesive consolidating and fiber looping section 30 of the apparatus shown in FIG. 1. As shown here, the web 14 continues directly from the web forming section 10 to the consolidating and looping section 30. It should be appreciated, however, that the web 14 discharged from section 10 could be rolled up for storage or transport and then subsequently unrolled and fed into section 30. Also, as previously mentioned, other webs such, merely by way of example, as those made in accordance with the methods disclosed in the aforesaid copending applications, Ser. Nos. 498,929 and 553,483, can be further processed in section 30.

As illustrated in FIG. 1, the web 14, while still under tension, is fed around an idler roll 32 and onto the surface of a heated forming drum 37. In its preferred embodiment, the drum 37 is made of metal with a highly polished, chromium plated surface which is heated and maintained at a temperature of approximately 250° F. Also, the web 14 is arranged to travel a substantial distance around the drum 37 with the open pattern of adhesive 16 in contact with the heated drum surface. As the web 14 is fed onto the drum 37, the heat from the drum surface reactivates and softens the adhesive printed on the underside of the web, causing it to be tacky and to adhere slightly to the drum surface, thereby maintaining the web under constant tension. The drum temperature, which is maintained at about 250° F., is, however, maintained below the melting point of the adhesive to prevent dispersion of the adhesive into the fibers of the web.

The web 14 of fibers and softened adhesive is reformed by the cooperative action of the drum 37 and a gathering blade 38 having a flat edge 39. The blade edge 39 operates to consolidate the open adhesive pattern 16 into a substantially continuous backing layer of adhesive, while simultaneously looping the fibers of the web outwardly from between the open spaces in the original adhesive pattern. The reformed and consolidated material 40 then leaves the blade edge 39 and moves onto a flat take-off surface 41 and a discharge conveyor 52.

Turning now to FIGS. 7-9, the method of making the novel high-loft, nonwoven fabric 40 will be explained in greater detail in connection with an illustrative sequence of the gathering and looping of a single fiber of the web 14 and the consolidation of its two original points of adhesive attachment in the pattern 16. As seen in FIG. 8, the fiber has a portion P which extends across the open space of the diamond pattern of adhesive 16 from point A to point B where it is embedded in the adhesive. Referring to FIG. 7, the series of views in this figure illustrates how the portion P of the fiber is formed into a loop; viz, when point A being carried around the heated drum 37 impinges against the gathering blade edge 39, its forward motion is halted and it is scraped along the surface of the drum, while point B continues to advance with the drum surface since, due to its softened and tacky condiiton, it adheres to the smooth drum surface. As point B advances relative to point A, the portion P of the fiber between points A and B is caused to bow outwardly from the drum surface. Finally, point B overtakes point A and these points of adhesive are substantially consolidated as seen in FIG. 9. In the meantime, fiber portion P has been looped outwardly from the drum surface.

It will, of course, be understood that while looping of fiber portion P is occurring, additional adhesive points C-D, etc., travelling around the drum 37 impinge against the gathering blade edge 39 causing a consolidation of these adhesive points and looping of their intermediate fiber portions $P_1$ as is also indicated in FIG. 9. This occurs simultaneously at all points across the web at the blade edge, producing a substantially continuous backing layer of adhesive from which extends the multiplicity of loops formed by the fibers of the base web. The thus formed substantially consolidated layer of adhesive is carried away from the blade edge 39 along the take-off surface 41 and provides a substantially continuous backing layer for the outwardly looped fibers, thus producing the fabric 40.

While in the preferred form, it is desired to achieve substantially complete consolidation of the adhesive into a continuous backing layer, in practice it has been found that the degree of consolidation varies randomly throughout the substantially continuous backing and, therefore, it is possible to draw the fabric slightly, thus producing a substantially continuous adhesive backing layer with random openings therethrough. Since complete consolidation, while desirable, is not necessarily attained in practice the degree of consolidation is defined herein, and in the appended claims, in terms such as "to consolidate" the "open adhesive pattern into a substantially continuous adhesive layer." Thus, those skilled in the art will appreciable that terms such as "consolidate" as used herein and in the appended claims are intended to conote an arrangement for consolidating or compacting the open adhesive pattern into a substantially continuous adhesive backing layer—albeit that such "substantially continuous backing" may have, and often will have, small random fissures and gaps therein—all as distinguished from the arrangement disclosed in the aforesaid copending application, Ser. No. 820,224, wherein the open adhesive pattern is only partially consolidated to minimize bonding of adjacent lines of adhesive and thus form a discontinuous adhesive backing layer characterized by its elasticity and/or stretchability.

Another important feature is that not only does each fiber portion P loop outwardly from the drum surface but, also, as the loop is formed it turns, reaching a position in the fabric 40 generally perpendicular to the direction of the original alignment of fiber portion P. Thus, the fiber loops arrange themselves so that the plane of each loop is substantially normal to the original fiber alinement shown in FIG. 8. The reason for the loop twisting as it is formed may be explained by this observation. If two spaced points of a single fiber not in a web are brought together, it has been observed that the fiber will form a loop and, as the loop is formed, it twists towards a position of minimum internal stress, turning through an angle which tends to approach 180°. In carrying out the method because of the great number of fibers in the web and their proximity one to another, each fiber loop engages the neighboring fiber loops with the result that all the loops are blocked from turning beyond the plane substantially normal to the machine direction, and are constrained in that position by the interference between the loops. In practice, of course, the actual direction and degree of loop twist depend upon the characteristics of the fibers in the original web 14.

It is important to note, however, that throughout the fabric the heights of the fiber loops vary according to the spacing between the points of attachment of each fiber to the open adhesive pattern in the base web. Referring to FIGS. 4, 8 and 9, it will be seen, for example, that the loop formed by the fiber portion $P_1$ between the points of adhesive attachment C, D will have a lower height than the loop formed by the longer fiber portion P between the points A, B. On the other hand, however, successive loops in adjacent diamonds, when viewed in a vertical section taken along the machine direction (FIG. 5), will have the same height since the fiber length P will remain the same between successive sets of points A, B. This results in a dense fabric with the lower loops supporting and filling around the higher loops and the top surface of the fabric being formed by the tops of the higher loops.

The appearance of a fabric so constructed depends not only on the height of the fiber loops but, also, on the type and denier of the fiber used in the base web, and one of the features of the invention is that the depth of the fabric and the evenness of the surface may be varied by adjusting selected ones of the control parameters, as will be explained below. In general, it may be said that for both relatively low and moderate height high-loft materials which have been produced with the method of this invention, the fabric appears to have a uniform thickness with a somewhat uneven surface texture. With very deep high-loft fabrics, particularly those made from flexible, low denier fibers, the higher loops tend to lay one over the other, thus providing a very soft, napped, fuzzy, fibrous surface.

To illustrate the effect of varying one of the control parameters, in this case, the angle of the edge of the blade 38 relative to the drum 37 will now be described. Referring to FIG. 6, it will be seen that the blade edge 39 forms an angle $\alpha$ with the line T tangent to the surface of the drum 37. It has been found that the blade edge angle $\alpha$ is one parameter that determines the depth of the fabric produced and the degree of uniformity of consolidation of the adhesive backing layer.

As a result of trying different blade angles, it has been determined that the preferred blade edge angle $\alpha$ when dealing with adhesive patterns having lines of adhesives spaced approximately ¼″ apart is between about 17° and about 34°. With blades having edge angles within this preferred range, fabrics have been produced which are characterized by having a high degree of uniformity of consolidation of the adhesive backing layer which is substantially void of fissures or gaps and, by having a dense, regular mass of loops that provide a textured, somewhat uneven surface.

With blades having edge angles $\alpha$ less than 17°, difficulty has been experienced in obtaining a uniformly consolidated adhesive backing layer. This appears to be the result of insufficient relief between the blade edge and the drum surface for the fabric to flow evenly and smoothly off the drum surface as the result of the action of the blade, which produces varying degrees of consolidation of the adhesive and a non-uniform layer with fissures and gaps and scattered areas where the looping is irregular, tending to spoil the surface appearance of the fabric. With blades having edge angles substantially above 34°, both the problem of non-uniform adhesive consolidation and poor loop formation has been experienced. There is also a tendency as the angle $\alpha$ of the blade edge is increased substantially above 34° for the fabric to be formed with pronounced ridges, which may be undesirable in the finished product.

In practice, it has been found that one of the major factors effecting the thickness of the fabric is the loop height as determined and limited by the spacing between points of fiber adhesive attachment A–B, C–D, etc. (FIG. 8). To obtain the maximum thickness of the fabric with a given adhesive pattern, the blade edge angle $\alpha$ should be such as to produce not only sufficient consolidation of the adhesive layer to provide good fiber attachment throughout the fabric but, also, sufficient consolidation to insure the production of a maximum number of full height fiber loops. Thus, as the blade edge angle $\alpha$ increases, the condition is approached where the web is being skived off the roll rather than being consolidated and gathered. The fabrics produced with higher blade edge angles $\alpha$ have reduced adhesive consolidation and fabric thickness because fewer loops reach their maximum height.

In using a blade 38 having an edge angle $\alpha$ within the preferred range, it has been found that the fabric loft may be regulated by changing the machine direction dimension of the adhesive pattern. Thus, by increasing this dimension, the height of the loops may be increased, thereby increasing the fabric loft. Larger diameter fibers, strands, or yarns may also be used as the elements of the base web to produce heavier, carpet-like finished fabrics. The adhesive and its pattern of application must, however, take into consideration the amount of adhesive required to form the backing layer under the consolidating action of the gathering blade 38, and sufficient adhesive must be present to provide a substantially continuous backing layer of sufficient thickness to obtain strong attachment of the loops in the finished fabric. More specific disclosures of types of adhesive patterns suitable for use in making carpet-like fabrics of larger diameter fibers, strands, or yarns may be found in the aforesaid copending application of Robert J. Stumpf, Ser. No. 856,793, and the aforesaid copending application of Herman G. Minshell, Robert J. Stumpf and William J. Mattes, Ser. No. 77,840, both of which are assigned to the assignee of the present invention.

Now turning to a consideration of a different control parameter—viz, the location of the take-away surface 41—the preferred location of the take-away surface is, as shown in the extreme right-hand view in FIG. 7, tight against the blade 38 and even with the outside corner 39′ of the blade. With the surface 41 in this preferred location, the fabric may have a moderately even surface texture and a dense mass of loops forming a deep, high-loft pile.

It has been found that by lowering the take-away surface 41 a distance "Y" (FIG. 7) from its preferred location, the structure of the fabric will be drastically affected, in that the bulk of the fabric may be increased substantially by lowering the take-away surface 41. The effect of lowering the surface is somewhat similar to the effect from using a blade 38 with an edge angle $\alpha$ substantially above the preferred range in that pronounced ridges are also produced in the fabric, thereby increasing its bulk. The amount that the take-way surface is lowered does clearly effect the degree of bulking, and it is apparently the case that as the distance "Y" increases, the fabric bulk increases.

A further related parameter that affects the gathering function of the blade is the take-away speed of the fabric from the blade edge. With blade 38 having an edge angle $\alpha$ within the preferred range, and a take-away surface at the preferred location, the take-away speed is desirably regualted to remove the newly formed fabric at the rate at which it is being formed, and it has been found that under these conditions the normal ratio of the surface speed of the heating drum 37 to the take-away speed will be about 12:1. By increasing the ratio up to, for example, 15:1, by slowing down the fabric take-away speed, more uniform adhesive consolidation has been obtained while the mass of the fiber loops is made somewhat more dense, so that a fabric with a higher weight has been produced. By increasing the fabric take-away speed, such that the fabric is not allowed to gather at the blade edge 39, the fabric will be drawn or extended while the adhesive layer is still in a plastic condition, thereby opening the adhesive layer, thinning the fabric pile, and reducing the weight of the finished material.

In addition to the diamond pattern, other adhesive patterns which may be used include unevenly spaced lines of application, such as criss-crossed sine waves 80 as shown in FIG. 17. The spacing of such lines of adhesive may furthermore be increased or decreased to change the maximum height of the element loops and, thus, the depth' and surface texture of the finished material.

Figure 19:
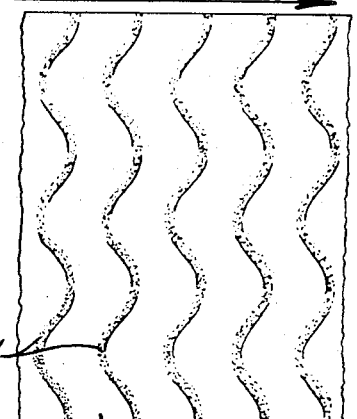
Figure 18:
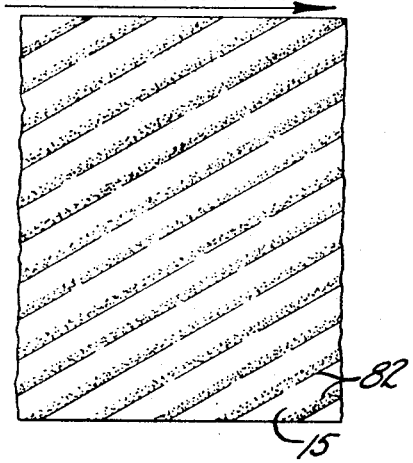
Figure 20:
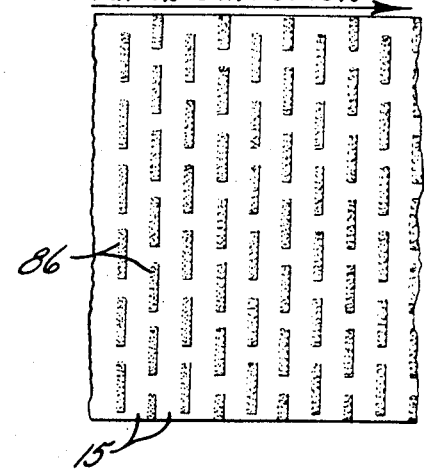

When criss-crossed lines of adhesive are used, the loops of the fabric will have varying heights due to the different spacings of the points of attachment (A–B, C–D— FIG. 8) of the base web elements to the adhesive. To produce a fabric with loops of uniform height, the adhesive is applied to the base web 14 in lines evenly spaced apart and extending across the web. Furthermore, the spacing between the lines of adhesive may be increased or decreased to obtain a higher or a lower pile height, as desired. Referring to FIG. 18, one such adhesive pattern is illustrated in the form of evenly spaced diagonal lines 82. Another such adhesive pattern is illustrated in FIG. 19, in the form of lines 84, each in the shape of a sine wave. A brick-like pattern is another such pattern as shown in FIG. 20. If broken lines of adhesive are utilized to obtain element looping—such, for example, as the brick-like pattern of FIG. 20—the gaps in the lines of adhesive 86 should be staggered so that the web elements longitudinally span the spaces between the adhesive lines and are securely attached to the adhesive.

When the spacing of points of attachment of the fibers to the adhesive varies regularly over the area of the base web as, for example, when an open diamond pattern of adhesive is used, the loops in the finished fabric will vary in height in a regular manner to provide a uniformly varying surface having a textured appearance. When, on the other hand, an open pattern of adhesive is used in which, in the cross direction of the base web 14, the lines of adhesive are parallel, or evenly spaced, it will be seen that the spacing of points of attachment of the elements to the adhesive will be uniform over the total area of the fabric, and the loops in the finished fabric will be of uniform height to provide a more even surface. The appearance of such a surface will, of course, be affected by the characteristics of the elements which form the loops. Thus, where the elements are yarn or heavy strands of fibers such, for example, as disclosed in the aforesaid copending application of Herman G. Minshell, Robert J. Stumpf and William J. Mattes, Ser. No. 77,840, the loops will be clearly visible, while where the elements are small diameter, flexible fibers, the surface will have a fibrous appearance, the fiber looping being less evident.

It has been observed that the transverse adhesive lines, when consolidated by the action of the gathering blade 38, are moved into proximity or abutment with each other and, being in a soft tacky state due to the high temperature of the heating drum 37, tend to bond to each other. However, the bond between lines of adhesive may be broken and the open pattern of adhesive substantially restored by drawing the fabric in the machine direction after the adhesive backing layer has been cooled, all as more clearly described in the aforesaid copending application Ser. No. 820,224. It may thus be demonstrated that the backing layer, while it appears to be continuous in the finished fabric, actually comprises lines of adhesive extending in the cross direction of the fabric and bonded to each other.

In the application of the adhesive to the base web, it has been observed that by increasing the adhesive viscosity, a sharp, distinct printed pattern will be obtained such that the fibers are securely attached to the adhesive at distinct spaced points and are not embedded in adhesive throughout their length. It is desired to have spaced points of fiber adhesive attachment so that the fiber loops will be distinctly and separately formed at the gathering blade in such a manner as to extend outwardly from the adhesive bonding layer. Fiber sizes between 1½ denier and 15 denier have been successfully utilized in the base web 14 with a ¼ inch diamond pattern of adhesive. With higher denier fibers, or with strands or yarns used in the preparation of the base web, the adhesive pattern is preferably enlarged so as to insure attachment of the fibers or strands to the adhesive at spacings along the length of the threads or yarns which will define the depth of pile or degree of loft in the finished material. With the lightweight webs of rayon the ratio of fiber to adhesive is preferably approximately 1:1. It has been found that the degree of adhesive fiber attachment in the base web was affected when the fiber-to-adhesive ratio with such type fibers was substantially increased above 1:1, so that the fiber loops did not form properly at the blade 38, nor did the fibers have sufficient attachment to the adhesive layer in the finished fabric. On the other hand, increasing the relative amount of adhesive in the base web had the result of producing a thicker adhesive layer in the finished material and more secure fiber attachment, but the adhesive lines tend to disperse so that the pattern becomes less open, thereby affecting the height of the loops, which is undesirable. The fiber-adhesive ratio will be different however, for base webs of yarns and threads where it appears that less amounts of adhesive, relatively speaking, will provide adequate attachment of the loops to the adhesive backing layer.

While staple length rayon fibers may be used for the preparation of the fabrics, other fibers may also be used in the process in its preferred form, and have resulted in fabrics of excellent properties of hand, drape, and appearance.

For example, acrylic, olefin and polyester fibers have been used, and it is within the contemplation of the invention to use any or all of these fibers by themselves or in blends, as well as natural fibers, acetate, nylon and other synthetic fibers in staple length or in monofilament form, any of which may be used for the preparation of the base web 14. Moreover, not only highly drafted webs and carded webs of staple length fibers may be used for the base web, but, also, garnetted and air-laid webs of such fibers as well as directly laid alined webs of monofilament. It has been noted, however, that when webs such as carded webs are used for the base web in which an important proportion of the fibers are randomly oriented, those fibers not alined with the machine direction appear to interfere with the loop production by the gathering blade. The most regular formation of loops with the loops turned normal to the machine direction has been produced with those base webs having the highest proportion of fibers alined with the machine direction as, for example, the highly drafted webs made with the apparatus illustrated schematically in FIG. 1.

It is also contemplated that flexible threads, yarns or strands may be used for forming a base web, provided that the flexibility of such elements is high enough to permit looping of the fibers and turning of the loops in the manner heretofore described. To obtain regular loops of such elements in the finished material, it is clear that substantially all such elements should be parallel and extend longitudinally of the web, for loop formation will be interfered with by those elements that substantially depart from such longitudinal alinement.

It has been found that in order to produce a material fully in accordance with the present invention, the elements should be sufficiently flexible to allow the loops to form and to twist normal to the machine direction while being formed under the action of the adhesive consolidating and gathering blade 38. Thus, neither stiff strands which do not loop under the action of the gathering blade 38, nor multiple strand yarns in which the lay of the strands opposes the tendency of the loops to twist while being formed under the action of the blade, will satisfactorily serve as elements of the base web 14 when it is desired to produce a fabric fully in accordance with the present invention.

It will, therefore, be seen that the features of the finished fabric are determined by the characteristics of the particular elements used in the formation of the base web 14 and, to some extent at least, by the nature of the process used in forming the base web.

Additional preliminary steps in the formation of the base web 14, as well as subsequent steps for processing the fabric 40 after it flows from the gathering blade 38, may be optionally carried out to alter the characteristics of the finished fabric.

Referring to FIG. 1, the base web 14, as has been previously described, may be formed of webs from two drafting frames 12, 25 supplied with staple length fibers or monofilaments. Patterns of color or of fibers which differ from the main constituent of the fabric may be introduced into the finished fabric 40 by utilizing certain preliminary steps in the formation of the base webs.

For example, the underweb from the first drafting frame 12 may be made from fibers of a solid color while at spaced intervals across the base web 14a bands of one or more colors may be introduced by passing colored fibers through the second draw frame 25 so that the colored fibers are laid on the underweb 14a. The top layer 14b of fibers may be applied in the pattern desired and, it has been found, will effectively screen out the underweb color in most instances so that the finished material will display a striped appearance.

The top layer 14b of fibers from the draw frame 25 may also be introduced in a wavy or saw-tooth pattern to produce either a wavy or saw-tooth effect completely across the fabric, as illustrated in FIG. 2, or in bands across the fabric as desired.

Alternatively, the under layer 14a of the base web 14 may embody different colored fibers by having the fibers at the margins, for example, of one color while the fibers across the center of the web are of a different color or colors. To this end, different colored fibers may be introduced through either or both draw frames 12 and/or 25. The top layer of fibers may be in the form of spaced bands of fibers across the web, or the different color may be introduced through only the second draw frame 25 by laying down a uniform layer of fibers in which at least certain of the adjacent slivers are of different colors. Where the top layer of the base web comprises spaced bands of fibers, it will be appreciated that the finished fabric will have a varying weight across the web, with a double weight and a more dense mass of loops in the bands where the top fibers are laid down.

Other procedures may be used for introducing patterns into the finished fabric. For example, a layer of fibers in the form of a section of a web from the second draw frame 25 may be laid on a web from the first draw frame 12 or onto a carded web underlayer. Due to the consolidation operation performed by the gathering blade 38, the pattern will be shortened lengthwise but not appreciably disarranged laterally, such that whether the pattern introduced into the top layer of the base web 14, it will appear in the finished fabric in its fore-shortened form. A pattern of fibers may be introduced into the top draw frame 25, which will operate to aline the fibers and will draw or extend the pattern in the machine direction. The subsequent shortening effect by the gathering blade 38 will tend to reduce the pattern to its original form in those instances where the extent of the draw in the drafting frame 25— illustratively 15:1—is approximately the same as the take-away ratio.

As shown in FIG. 1, the fabric 40 is carried along the take-away surface 41 by the action of the conveyor 52. Since the adhesive backing is hot and tacky as the fabric flows onto the take-away surface 41, that surface may be treated with a non-stick or release coating to insure that the fabric may be drawn smoothly along the surface.

To cool the belt of the conveyor 52 and prevent it from becoming overheated from the hot adhesive back of the fabric 40, streams of air may be blown against the underside of the belt from suitably placed air nozzles 54. This will also serve to cool the fabric 40, although it may be necessary or desirable to pass the fabric through a cooling station or zone (not shown) to cool the adhesive and thermoplastic fibers to temperatures below their softening temperatures or to eliminate tackiness of the adhesive.

The second printing of adhesive

A further method step in the production of a high-loft fabric is disclosed in copending application of Herbert G. Minshell, Robert J. Stumpf, and William J. Mattes, Ser. No. 77,840, and basically involves the application of a second adhesive pattern upon the first applied open pattern of adhesive.

Referring to FIG. 10, an exemplary apparatus is shown for applying the second adhesive pattern to the base web, with the apparatus being suitably inserted between portions of the apparatus shown in FIG. 1 after the web is passed over roller 31 and before it reaches the drum 37. The exemplary apparatus 90 includes a first cooling station 92 for cooling the web and first adhesive pattern applied thereto, an adhesive applicator station 94 substantially similar to the adhesive application portion of the apparatus shown in FIG. 1, a curling roller 96 similar to the roller 29, and a second cooling station 98 for cooling the web prior to its traveling to the drum 37. The printing roller of the adhesive applicator station 94 also has an intaglio patterned surface substantially similar to the printing roll 20 shown in FIG. 1, so that the second adhesive pattern is applied to the first pattern of adhesive. In the event additional detailed information is desired concerning the method of its application, reference is made to the above mentioned copending application.

The double printing of adhesive on the fiber web may offer distinct advantages in the resulting fabric, depending upon the particular fibers, threads, or the like that are being used. For example, assuming the wall covering material is to be produced incorporating relatively heavy denier fibers, as well as yarns, threads or the like that have either single or multiple threads, the double printing of adhesive in many instances insures the secure attachment of the ends of the loops within the adhesive backing, but does not interfere with the proper loop formation during the consolidation stage of the method. As is comprehensively described in the above copending application, the physical thickness of a single pattern of adhesive may be increased only to a degree. Also, the adhesives being applied to the web may be different with each of the different adhesives having characteristics contributing to a better quality fabric. For example, the adhesive applied in the first pattern may be characteristically adapted to enhance the fiber holding or retaining capabilities, while the second adhesive applied to the first pattern may have qualities which contribute to better consolidation during the adhesive consolidating and fiber looping step.

Thus, it is seen that for particular types of fibers, threads or the like that are incorporated into the base web, the double printing of adhesive step may be advantageously utilized.

The manufacture of wall paneling material in accordance with the present invention In carrying out the method of the present invention, the high-loft, nonwoven fabric produced during the consolidation step is subjected to additional method steps to yield the final wall paneling material.

The high-loft nonwoven fabric is then secured to a nonflexible material 18 such as ¼ inch, ⅜ inch or ½ inch plywood or pressed wood stock, although other materials such as heavy cardboard, a plastic or plastic-like material may conceivably be used. Since the backing of the fabric is a consolidated adhesive, it may be heated to reactivate an outer surface portion to make it tacky and may thereafter be secured to the nonflexible material 118. However, care must be taken to prohibit reactivation of the whole adhesive backing, which may cause the embedded ends of the loops to work out of the backing or otherwise depart from their preferred configuration which may adversely affect the appearance of the outer surface. A cross-sectional view of the fabric applied to the nonflexible material by this method is shown in FIG. 14.

Of course, other means for securing the fabric to the nonflexible material may be used, such as separately applying, either to the fabric or to the nonflexible material, a coating of adhesive in melt form immediately prior to the placing of the fabric on the nonflexible material. The type of adhesive used to secure the fabric to the nonflexible material may require the addition of a barrier layer to the adhesive backing of the fabric for reasons that will be explained below. Apparatus that will laminate the barrier layer as well as another adhesive system that may be used for securing the barrier layer to the nonflexible material will now be described.

For laminating the barrier layer to the fabric 40, the laminating station 100 includes a calender roll 102 which may have a hard rubber surface, and a preheat roll 104, which together form a nip for laminating the barrier layer 106 originating from supply roll 108. To insure securement of the barrier layer to the adhesive backing, the nip pressure between the calender and the preheat roll is at least 40 p.s.i.g. although it may be considerably higher, and the preheat roll 104 is heated to a temperature of about 375° F. to reactivate the consolidated adhesive within the backing.

Subsequent to application of the barrier layer 106, the fabric may then have another means for securing the fabric to the nonflexible material applied to the barrier layer. As previously mentioned, many different adhesives or adhesive systems may be used, and the embodiment illustrated in FIG. 13 has a nip formed between rollers 110 and 112 with an adhesive laminate 114 originating from roll 116 being applied. The adhesive laminate includes a thin sheet of paper or the like having adhesive applied to both sides thereof. The outer adhesive will ultimately secure the fabric to the nonflexible material, and is preferably a pressure sensitive adhesive, although other adhesives may be used. The outer adhesive may also be covered with a release coated cover strip or the like, such as silicone treated paper, which will protect the adhesive until immediately before application to the nonflexible material, whereupon the cover strip is peeled away.

In accordance with another aspect of the present invention, the barrier layer is preferably a thin polyester film, and may have a thickness of only approximately ½ mil. The polyester film may be Mylar as manufactured by Du Pont of Wilmington, Delaware. Mylar is preferably used as the barrier layer, for it is polar and thus exhibits good adhesion to a variety of surfaces and, in addition, it possesses sufficient thermal stability so that its structural integrity is not adversely affected when the film is secured to the high-loft material by, for example, reactivating the plastisol backing. Other polymeric films having similar characteristics can also be used, such as those prepared from polyamides, acrylics and urethanes. In addition, films formed from normally polar polymers such as olefins, e.g., polypropylene and polyethylene, can also be used, though they ordinarily require an adhesion promotion surface treatment to be most effectively utilized. Moreover, such films ordinarily do not have great thermal stability and, thus, unless they are stabilized, such as by cross-linking, care must be taken in the manner by which they are secured to the high-loft material.

As previously mentioned, the barrier layer imparts greater tensile strength as well as dimensional stability to the wall covering material, but in addition, acts as a barrier to prevent the plasticizer in the plastisol of the adhesive backing from leaching out of the backing. The leaching of the plastisol may adversely affect the bond between the wall covering material and the surface to which it is adhered because the plastisol may attack the adhesive system being used to secure the material to the surface. Thus, it is contemplated that in addition to the use of the film previously mentioned, impregnated papers as well as chemical sprays may be formulated to adequately seal the plasticizer and therefore prevent leaching.

In accordance with another aspect of the present invention, the polyester film may also be corona discharge treated to improve its degree of adhesion. It is also noted that the corona discharge treatment renders the Mylar film more opaque and may therefore improve the appearance of the wall covering material to a purchaser, as the opaquenesss at least partially covers the adhesive backing which may have an undesirable appearance. The corona discharge treatment simply involves subjecting the surface of the film to a high potential electric discharge.

The side of the barrier layer receiving the corona discharge treatment is the side which receives the adhesive system for securing the fabric to the nonflexible material. As previously mentioned, the corona discharge treatment increases the adhesion capability of the barrier layer. This coupled with the fact that the barrier layer is preferably quite smooth, contributes to a strong adhesive bond between the adhesive system and the barrier layer.

Subsequent to the particular adhesive system being applied to the fabric, in the event the adhesive backing of the fabric is not used as the means for securing the fabric of the nonflexible material, the fabric may then be cut into the conventional commercially marketed sizes for paneling materials. The final product is shown in the perspective view of FIG. 16 and is characterized by a paneling having a high loft or deep pile appearance and texture which may be installed in the same manner as conventional solid wood or wood veneered paneling.

I claim:

1. A method for producing a paneling material having a nonwoven outer surface comprising of a multiplicity of outwardly looped elements, the method comprising the steps of:
    preparing a web including flexible elements extending longitudinally of the web;
    bonding the elements in an open pattern of adhesive;
    reactivating the adhesive to a tacky state;
    consolidating the open pattern of tacky adhesive at a consolidating station
        (i) to form a backing layer
        (ii) while looping the element portions located in the open spaces of the adhesive pattern outwardly from the backing layer;
    conveying the consolidated backing layer and outwardly looped elements away from the consolidating station; and,
    attaching a nonflexible material to said backing layer to form a paneling material.

2. The method of claim 1 wherein the elements of the web are staple length fibers.

3. The method of claim 1 wherein the elements are selected from the group consisting of synthetic yarns, natural yarns, synthetic threads, natural threads, or blends thereof.

4. The method of claim 1 wherein the open patteern of tacky adhesive is substantially fully consolidated to form a substantially continuous adhesive backing layer.

5. The method of claim 1 wherein a barrier layer is applied to adhesive backing prior to the step of attaching the nonflexible material.

6. The method of claim 5 wherein the barrier layer is comprised of a polyester film.

7. The method of claim 6 wherein the polyester film is corona discharge treated on at least one side thereof.

8. The method of claim 1 wherein the open pattern comprises a series of interconnected diamonds.

9. The method of claim 1 wherein:
    reactivation of the adhesive to a tacky state is achieved by carrying the web onto a heated surface; and,
    consolidation of the open pattern is achieved by impinging elements and the tacky adhesive against the edge of a relatively moving g;athering blade.

10. The method of claim 1 wherein a second open pattern of second adhesive is applied to the first applied open pattern of adhesive, the second pattern being substantially similar to the first applied pattern, the second pattern of adhesive being applied subsequently of bonding the elements in the first applied pattern of adhesive.

11. The method of claim 10 wherein the elements are bonded in the second pattern of applied adhesive.

12. The method of claim 1 wherein said nonflexible material is selected from the group consisting of plywood, pressed wood, cardboard and plastic materials.

13. A method for producing a paneling material having a nonwoven outer surface comprising of a multiplicity of outwardly looped elements, the method comprising the steps of:
    preparing a web including flexible elements extending longitudinally of the web;
    bonding the elements in an open pattern of adhesive;
    carrying the web onto a heated smooth surface which heats the adhesive to a tacky state causing it to adhere to the surface;
    consolidating the open pattern of tacky adhesive by impinging the elements and the tacky adhesive adhered to the surface against the edge of a relatively moving gathering blade
        (i) to form a backing layer
        (ii) while looping the element portions located in the open spaces of the adhesive pattern outwardly from the backing player;
    conveying the consolidated adhesive backing layer and outwardly looped elements away from the surface; and
    attaching a nonflexible material to said backing layer to form a paneling material.

14. The method of claim 13 wherein said nonflexible material is selected from the group consisting of plywood, pressed wood, carboard and plastic materials.

References Cited

UNITED STATES PATENTS

| | | | |
|---|---|---|---|
| 2,550,686 | 5/1951 | Goldman | 156—471 |
| 2,639,250 | 5/1953 | Reinhardt | 161—65 |
| 3,142,611 | 7/1964 | Mills | 161—66 |
| 3,214,323 | 10/1965 | Russell et al. | 161—148 |
| 3,220,056 | 11/1965 | Walton | 18—19 |
| 3,236,718 | 2/1966 | Cohn et al. | 161—128 |

ROBERT F. BURNETT, Primary Examiner

R. O. LINKER, JR., Assistant Examiner

U.S. Cl. X.R.

156—90, 152, 183, 272; 161—67